March 24, 1970   K. K. KHRENOV ET AL   3,502,840
DEVICE FOR MAGNETIC-AND-PULSE WORKING OF METALS WITH PRESSURE
Filed Oct. 28, 1968
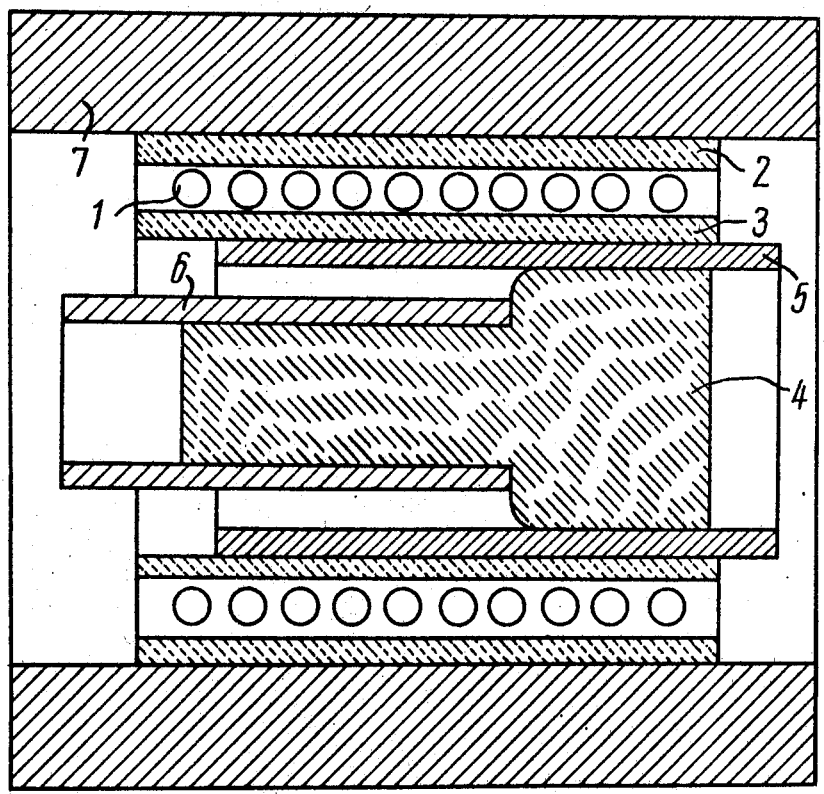

3,502,840
DEVICE FOR MAGNETIC-AND-PULSE WORKING
OF METALS WITH PRESSURE
Konstantin Konstantinovich Khrenov, ul. Cheljuskintsev, 15, kv. 11; Vyacheslav Andreevich Chudakov, ul. Bolnichnaya, 14, kv. 2; and Valentin Ivanovich Balakin, ul. Vernadskogo, 61, kv. 6/1, all of Kiev, U.S.S.R.
Filed Oct. 28, 1968, Ser. No. 771,124
Int. Cl. H05b 9/02, 5/00
U.S. Cl. 219—10.79                     3 Claims

ABSTRACT OF THE DISCLOSURE

For welding two tubular parts in concentric relation, the parts are encircled by an insulated coil which is, in turn, encircled by a housing of electrically conductive material. The current generated in the housing functions to provide a reaction with the inductive field of the coil which opposes the reaction of said field with the current in said parts. This preserves the coil.

---

The present invention relates to the field of magnetic-and-pulse working of metals with pressure, mainly for welding parts of tubular shape.

Known in the prior art is a device for magnetic and pulse working of metals with pressure, mainly for welding parts of tubular shape. The known device is provided with an inductor enclosed in a housing made from a dielectric material (see French Patent, Cl. B21d, B23p, No. 1,342,260).

Application of a dielectric material for the inductor housing rules out the possibility of using the inductor at a high capacity (600–700 operating cycles per hour) for, in this case, the inductor is heated and, hence, the housing is heated too. As a result, the housing loses its strength, which causes the inductor itself to fail very rapidly.

The cooling of the dielectric housing is not effective inasmuch as dielectrics are known to have low heat conduction and heat capacity.

An object of the present invention is to provide an improved device for the magnetic and pulse treatment of metals with pressure, and mainly for welding the parts of tubular shape, which device will be capable of increasing the service life of the associated inductor when used repeatedly (600–700 operating cycles per hour).

The above-mentioned and other objects are achieved by means of a device for the magnetic and pulse working of metals with pressure, and mainly for welding the parts of tubular shape, in which, according to the invention, its inductor is enclosed in a housing made from a current-carrying material.

The nature of the present invention will become more fully apparent from a consideration of the following description of an exemplary embodiment thereof, taken in conjunction with the accompanying drawing in which the sole figure shows a device for the magnetic-and-pulse treatment of pipes.

The proposed device is composed of an inductor whose turns 1 are enclosed in insulating gaskets 2 and 3, and which has a centering insert 4 for providing the required clearance between pipes 5 and 6 during the welding process. The inductor is enclosed in a housing 7 made of metal or an alloy of metals, which is characterized by good heat conductance and high mechanical strength.

The insulating gaskets 2 and 3 add to the insulation of the inductor. When reliable interturn insulation of the inductor is resorted to, the insulating gaskets 2 and 3 are no longer needed.

The centering insert 4 is of step type, which insures that welded pipes 5 and 6 of different daimeters are coaxially aligned, and the clearance between them is maintained within a specified range. The centering insert may be made both from metal and a dielectric material. In case of the welding of pipes of the same diameter, the centering insert is replaced by a rod, while the welded end of one of the pipes is being rolled out.

The housing 7 of the inductor is essentially a metal bushing which relieves the inductor of dynamic loads exerted thereon during the welding process and resulting in a reduction of effects of the inductor magnetic field on the welded parts and in the breakdown of the inductor itself. Use of the metal housing also contributes to decreasing the leakage flux of electromagnetic force.

The device shown in the drawing operates as follows.

Current passing through the turns 1 of the inductor builds up a magnetic field which forms, in its turn, secondary currents in the welded pipes 5 and 6, or in one of them—pipe 5—arranged closer to the inductor and its housing 7.

As a result of the interaction of the inductor's magnetic field with the current, there are set up forces in the pipes 5 and 6 directed from the center outwardly and tending to break down the inductor. Simultaneously, the currents in the housing 7 interacting with the inductor's magnetic field produce forces compressing the turns 1 of the inductor 4 and tending to reduce the inductor's diameter.

Hence, the inductor is simultaneously exposed to the interaction of two oppositely directed forces that, in reality, relieve the inductor of mechanical effects.

When the device is used in an automatic line, a metal housing is water-cooled or it has a developed exterior surface of the so-called radiator type.

Using the proposed device for magnetic-and-pulse working of metals, it is also possible to carry out blanking, drawing and upsetting operations on metal parts.

Application of the proposed device for magnetic-and-pulse working of metals with pressure will make it possible to render its operation reliable with a prolonged service life (600–700 operating cycles per hour) and, hence, to increase the labour productivity and to reduce the cost of manufacturing equipment.

When describing the embodiment of the present invention specific narrow terminology is used to clarify the subject under consideration. The invention, however, is not to be limited by these terms and each such term incorporates all equivalent elements operating in an analogous manner and used for same purposes.

Through the present invention has been described with reference to its preferred embodiment, it is evident that different modifications and variants may be made without departing from the spirit and scope of the invention which will be easily understood by those skilled in the art.

These modifications and variants are considered to fall within the spirit and scope of the invention, as defined by the appended claims.

What we claim is:

1. Welding apparatus for welding tubular parts, said apparatus comprising a coil for encircling said parts and adapted for the magnetic-and-pulse working thereof, an electrically conductive housing encircling said coil, and insulation separating the coil from the houing and said housing from the tubular parts, said coil tending to deform during a working operation due to the interaction of the inductive field thereof and current in said parts, said housing providing a protective reaction due to interaction of said field and current in the housing.

2. Apparatus as claimed in claim 1 wherein the housing is a metallic bushing.

3. Apparatus as claimed in claim 2 comprising centering means including two concentric parts of different diameter for supporting said parts within said coil.

References Cited

UNITED STATES PATENTS

| | | | |
|---|---|---|---|
| 2,542,393 | 2/1951 | Chapman | 219—8.5 |
| 2,868,938 | 1/1959 | Barfield et al. | 219—10.79 X |

FOREIGN PATENTS 1,342,260  9/1963  France.

JOSEPH V. TRUHE, Primary Examiner

L. H. BENDER, Assistant Examiner

U.S. Cl. X.R.

219—8.5